United States Patent
Filatov et al.

(10) Patent No.: US 8,833,517 B2
(45) Date of Patent: Sep. 16, 2014

(54) DEVICE FOR EMERGENCY LOWERING OF A PERSON FROM A HIGH-RISE BUILDING

(75) Inventors: Andrei Vasilevich Filatov, Moscow (RU); Yury Alekseevich Metelev, Moscow (RU); Sergei Vasilyevich Kulik, Moscow (RU)

(73) Assignee: Obschestvo S Ogranichennoi Otvetstvennostyu "Kosmicheskie Sistemy Spaseniya", Moscow (RU)

( * ) Notice: Subject to any disclaimer, the term of this patent is extended or adjusted under 35 U.S.C. 154(b) by 122 days.

(21) Appl. No.: 13/254,868

(22) PCT Filed: Apr. 14, 2010

(86) PCT No.: PCT/RU2010/000171
§ 371 (c)(1),
(2), (4) Date: Sep. 6, 2011

(87) PCT Pub. No.: WO2010/120211
PCT Pub. Date: Oct. 21, 2010

(65) Prior Publication Data
US 2011/0315475 A1    Dec. 29, 2011

(30) Foreign Application Priority Data
Apr. 15, 2009 (RU) ................... 2009114229

(51) Int. Cl.
*A62B 35/00* (2006.01)
*A62B 1/22* (2006.01)

(52) U.S. Cl.
CPC ........................ *A62B 1/22* (2013.01)
USPC ........................... 182/3; 244/138 R

(58) Field of Classification Search
USPC ............... 182/3, 70; 244/138 R, 146, 159.1, 244/159.2, 159.3
See application file for complete search history.

(56) References Cited

U.S. PATENT DOCUMENTS

| | | | | | |
|---|---|---|---|---|---|
| 3,092,854 | A | * | 6/1963 | Manhart | 441/38 |
| 3,217,325 | A | * | 11/1965 | Mullin | 342/8 |
| 3,405,887 | A | * | 10/1968 | Mixson | 244/158.9 |
| 3,433,435 | A | * | 3/1969 | Alai | 244/158.9 |
| 3,768,761 | A | * | 10/1973 | Cramer | 244/138 R |
| 3,921,944 | A | * | 11/1975 | Morrison | 244/138 R |
| 4,105,173 | A | * | 8/1978 | Bucker | 244/146 |
| 4,257,467 | A | * | 3/1981 | Van der Burg | 152/158 |
| 4,267,928 | A | * | 5/1981 | Curry, Jr. | 206/583 |
| RE32,560 | E | * | 12/1987 | Givens | 441/37 |
| 5,044,579 | A | * | 9/1991 | Bernasconi et al. | 244/158.3 |
| 5,259,574 | A | * | 11/1993 | Carrot | 244/100 A |

(Continued)

*Primary Examiner* — Katherine Mitchell
*Assistant Examiner* — Candace L Bradford
(74) *Attorney, Agent, or Firm* — Bardmesser Law Group

(57) ABSTRACT

An apparatus for the emergency lowering of a person from a high-rise building is fastened on the person's back. The apparatus includes an inflatable central toroidal chamber having a membrane for accommodating the person. The chamber is connected on one side to inflatable shafts which, upon inflation, are arranged in a cone, and which are interconnected by inflatable connectors. The chamber is connected on the other side to an inflatable damping structure with a toroidal inflatable chamber connected by inflatable shafts to the central toroidal chamber. The toroidal inflatable chamber of the damping structure has a diameter which is greater than the diameter of the central toroidal chamber and is less than the diameter of the base of the cone formed by shafts straightened out upon inflation. An air-impermeable perforated fabric is stretched between the shafts and toroidal chambers. An independent gas source is connected to one of the toroidal inflatable chambers or to one of the inflatable shafts.

6 Claims, 1 Drawing Sheet

(56) References Cited

U.S. PATENT DOCUMENTS

| | | | |
|---|---|---|---|
| 5,341,756 A * | 8/1994 | Hinze | 114/54 |
| 6,237,875 B1 * | 5/2001 | Menne et al. | 244/138 R |
| 6,264,144 B1 * | 7/2001 | Thornton | 244/159.2 |
| 6,467,731 B1 * | 10/2002 | Harris et al. | 244/159.1 |
| 6,607,166 B1 * | 8/2003 | Pichkhadze et al. | 244/138 R |
| 8,070,105 B2 * | 12/2011 | Johnson et al. | 244/158.3 |
| 2007/0169993 A1 * | 7/2007 | Rhee | 182/3 |
| 2009/0230366 A1 * | 9/2009 | Wakatake et al. | 252/609 |
| 2010/0331467 A1 * | 12/2010 | Wakatake et al. | 524/401 |

\* cited by examiner

DEVICE FOR EMERGENCY LOWERING OF A PERSON FROM A HIGH-RISE BUILDING

CROSS-REFERENCE TO RELATED APPLICATIONS

This application is a U.S. National Phase of PCT/RU2010/000171, filed Apr. 14, 2010, which claims priority to RU 2009114229, filed on Apr. 15, 2009.

BACKGROUND OF THE INVENTION

1. Field of the Invention

The present invention is related to people rescue equipment, and in particular, to an apparatus designed to rescue people in emergency, mainly for lowering people from top floors of high rise buildings in case of fire and other emergency.

2. Description of the Related Art

A number of lifesaving emergency devices are known. One example is a lifesaving device designed for receiving people jumping or falling from high altitude. This receiving device comprises a pneumatic chamber that includes flexible tubing that forms the top and bottom base areas covered with a flexible shell (including horizontal absorbing membrane) and joined by vertical tubes (RU Patent No. 2150980, 1999). The disadvantage of this device is that the volume of the frame takes up a considerable part of the total capacity size of the receiving chamber.

Another conventional example is a personal emergency device for lowering of people from high-rise buildings. This device is a knapsack fastened to a back of an escaping person. The device has an intermediate membrane with a folded parachute inside. The parachute has inflatable chambers intended for formation of a base of pneumatic carcass. The chambers create an elastic skirt that forms a cone shapes deceleration shield, and a landing basket also formed by the inflatable chambers (RU published application No. 2003124165/12, Aug. 5, 2003). The disadvantage of this device is its large size, heavy weight and low efficiency.

Yet another example is a personal emergency device for lowering people from high-rise buildings, comprising a knapsack equipped with a fastener for fixing it to a back of a rescued person. The knapsack has an intermediate membrane with a folded parachute and inflatable chambers. The chambers form a base of pneumatic carcass. The chambers create an elastic skirt that forms a cone shaped deceleration shield. A landing basket is also formed by the inflatable chambers. A parachute opening assembly includes a gas source attached to the knapsack and interconnected with the inflatable chambers via flexible elastic gas pipes and inflatable chambers for formation of a landing basket. The inflatable chambers of the landing basket are designed in the form of a bottom base and upright columns.

The columns are connected with the bottom base of the pneumatic frame. Thus, the landing basket has several vertical and horizontal walls and top and bottom separating walls forming cavities. The lower separating wall has holes, and the top separating wall is fastened to the bottom base of the pneumatic frame and with the knapsack (RU Patent No. 2288758, 2006). A disadvantage of this device is its large size, heavy weight and low efficiency.

Yet another example of a personal emergency device for lowering people from high-rise buildings comprises a knapsack provided with a fastener for fixing it to a back of a rescued person. Part of the knapsack is a supporting element that contains an inflatable frame and a toroidal chamber inflatable by a gas generator and connected to inflatable shafts, which are connected to the upper toroidal chamber of a cylindrical inflatable structure.

The structure is formed by toroidal inflatable chambers placed on top of each other (each chamber has a smaller diameter). Thus, a conical deceleration shield is formed. The top inflatable toroidal chamber of a smaller diameter is fixed to the supporting element of the knapsack. The cylindrical chamber is inflated to the atmospheric pressure and has calibration holes for releasing an excessive pressure created by an external stress at the moment of hitting the ground. This chamber is placed under the supporting element to which the rescued person is fastened.

The person is placed in the cavity formed by the cylindrical arrangement of inflatable toroidal chambers of the smaller diameter and the toroidal chambers of the larger diameter. The supporting element of the knapsack is designed in the form of an anatomic cradle conformed to the form of a back of a person. It is fixed to the top inflatable toroidal chamber of a smaller diameter by strips. A gas generator for inflatable toroidal chamber is designed in the form of cold gas generators. It is placed in the cavity of the inflatable toroidal chamber. At least in one of the shafts has the gas generator installed in it. The gas generator connects two chambers isolated from other chambers and shafts (RU No. 66206, published in 2007).

A disadvantage of this device is that it has a large size, is heavy and has low efficiency in terms of energy dissipation of the system with the person at a moment of landing. This solution is taken as a prototype that the present invention improves upon. Accordingly, there is a need for a lightweight efficient apparatus for rescuing people from high rise buildings in case of an emergency.

SUMMARY OF THE INVENTION

The present invention is related to people rescue equipment, and in particular, to an apparatus designed to rescue people in an emergency, mainly for lowering people from top floors of high raised buildings in case of fire and other emergency, that substantially obviates one or several of the disadvantages of the related art.

According to a first exemplary embodiment, a personal emergency apparatus for lowering people from high-rise buildings is affixed to a back of a person. The device comprises a central toroidal chamber inflatable by an independent gas-filling source. A membrane for accommodating a person is attached to the chamber. The membrane is connected (on one side) to the inflatable shafts. The shafts are connected by inflatable connectors and are arranged in a cone shape upon inflation. The other side of membrane is connected to an inflatable damping structure that has its own toroidal inflatable chamber connected by inflatable shafts to the central toroidal chamber.

The toroidal inflatable chamber of the damping structure has a diameter greater than the diameter of the central toroidal chamber and is less than the diameter of the base of the cone formed by the shafts. The shafts are straightened out upon inflation. An air-impermeable perforated fabric is stretched between the shafts and toroidal chambers. Alternatively, the shafts, together with the toroidal chambers, are covered by air-impermeable perforated protective covers in order to form a conical deceleration shield in the form of two truncated conical pyramids with a common base at the central toroidal chamber zone.

The conical pyramids have large bases of different diameter pointed in opposite directions. The toroidal chamber of a damping structure has a membrane stretched inside it. An independent gas-filling source is connected to one of the toroidal inflatable chambers or to one of the inflatable shafts. The internal areas of all the toroidal chambers and shafts are connected with one another and form a single closed area.

According to a second exemplary embodiment, a personal emergency device for lowering people from high-rise buildings is affixed to the back of a person. The device comprises a central toroidal chamber inflatable by an independent gas-filling source. A membrane for accommodating a person is attached to the chamber. The membrane is connected (on one side) to the inflatable shafts. The shafts are connected by inflatable connectors and are arranged in a cone shape upon inflation. The other side of membrane is connected to an inflatable damping structure that has its own toroidal inflatable chamber connected by inflatable shafts to the central toroidal chamber.

The toroidal inflatable chamber of the damping structure has a diameter greater than the lower toroidal inflatable chamber and has a diameter larger than the diameter of the central toroidal chamber. The shafts are straightened out upon inflation. An air-impermeable perforated fabric is stretched between the shafts and toroidal chambers. Alternatively, the shafts, together with the toroidal chambers, are covered by air-impermeable perforated protective covers in order to form a conical deceleration shield in the form of two truncated conical pyramids with a common base at the central toroidal chamber zone.

The conical pyramids have large bases of different diameter pointed in opposite directions. The toroidal chamber of a damping structure has a membrane stretched inside it. An independent gas-filling source is connected to one of the toroidal inflatable chambers or to one of the inflatable shafts. The internal areas of all the toroidal chambers and shafts are connected with one another and form a single closed area.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

According to the exemplary embodiment, a personal emergency apparatus for lowering people from high-rise buildings, implemented as an inflatable deceleration unit, is provided. This apparatus is intended for personal rescue of people and valuable cargoes located on any floor of high-rise buildings in case of a fire or other emergencies requiring an emergency evacuation.

The proposed rescue apparatus combines both an effective aero-deceleration device and a damping device. Special skills are not required to use the apparatus. The apparatus can be used almost instantly. The apparatus protects a person being rescued during descend from hits against the walls and from the high temperature and open flames. The damping system (i.e., damping construction) provides for a safe and soft landing.

The components of the rescue system provide for an estimated descent and landing speed. The system comprises two stages: main stage in a form of "inverted or inverse truncated cone" and a second stage (also in a form of a truncated cone), but with a smaller diameter for a damping structure. In the inflated, unfolded (operational) state, the apparatus has a shape of two truncated cones connected with each other by their tops and having different diameters of their outside bases. The apparatus has a central toroidal inflatable chamber 1 at the base of both cones. According to the exemplary embodiment, the rescue apparatus is aerodynamically steady and self-orients in flight, so during the descent it constantly turns in such a manner that the large cone is above and a small cone is below.

Figure 1:
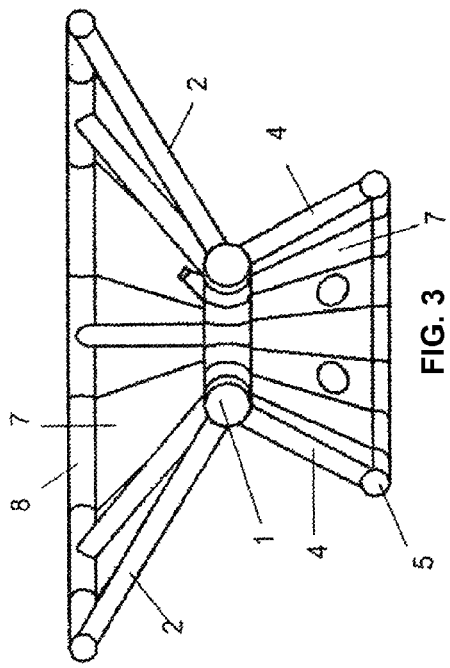
FIG. 1 illustrates a side view of an emergency device for lowering people from high-rise buildings in accordance with a first exemplary embodiment.
Figure 2:
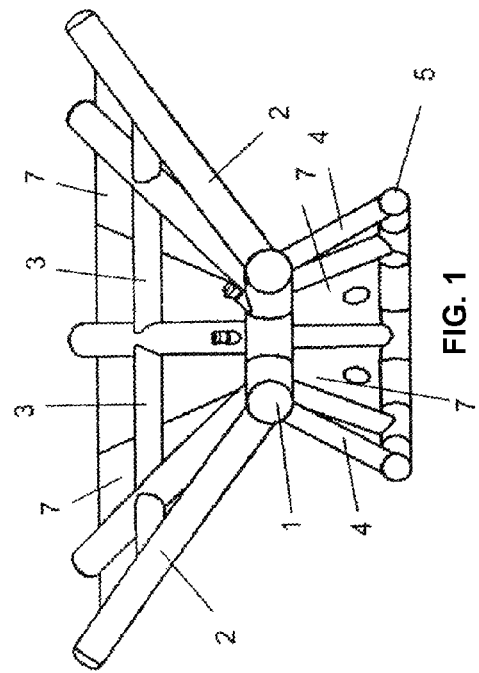
FIG. 2 illustrates a top view of an emergency device for lowering people from high-rise buildings in accordance with a first exemplary embodiment.

The personal emergency device for lowering people from high-rise buildings according to the first exemplary embodiment (FIGS. 1 and 2) comprises means for fixing it to the back of a rescued person. It includes a central toroidal inflatable chamber 1 inflatable by a gas generator. The central toroidal inflatable chamber 1 is connected on one side to the first inflatable shafts 2 arranged in a cone upon inflation. The first inflatable shafts 2 are interconnected by inflatable connectors 3.

The central toroidal inflatable chamber 1 is connected on the other side to an inflatable damping structure, composed of the second inflatable shafts 4 connected by a bottom toroidal inflatable chamber 5. The membrane 6 for accommodating a rescued person is attached to the central toroidal inflatable chamber 1. The bottom toroidal inflatable chamber 5 has the diameter greater than the diameter of the central toroidal inflatable chamber 1 and less than the diameter of the base of the cone formed by the first inflatable shafts 2. The bottom toroidal inflatable chamber 1 is connected to the central toroidal inflatable chamber 1 by the second inflatable shafts 4.

An air-impermeable fabric 7 is stretched between the first inflatable shafts 2 and the second inflatable shaft 4. Alternatively, the first inflatable shafts 2 and the second inflatable shafts 4 together with the central toroidal inflatable chamber 1 and the bottom toroidal inflatable chamber 5 are covered by air-impermeable covers (i.e., layers). An air-impermeable fabric or air-impermeable covers are perforated. The membrane 9 is stretched (not shown) in the bottom toroidal inflatable chamber 5 for formation of two truncated conical pyramids with a common base in the central toroidal chamber zone and with large bases of different diameter directed outwards for formation of a conic deceleration shield.

An independent gas-filling source communicates with one of the central toroidal inflatable chamber 1 and the bottom toroidal inflatable chamber 5, or with one of the first inflatable shafts 2 and the second inflatable shafts 4. The internal areas of all of the central and the bottom toroidal inflatable chambers 1, 5 and the first and the second inflatable shafts 2, 4 are connected with one another and form a single closed area. According to the first exemplary embodiment depicted in FIGS. 1 and 2, a fastener for fixing the apparatus to the back of a rescued person is designed in the form of a knapsack (not shown) which includes the central toroidal inflatable chamber 1 inflatable by a gas generator (source).

The central toroidal inflatable chamber 1 is connected on the one side to the first inflatable shafts 2. The first inflatable shafts are connected with each other by the inflatable connectors 3. A diameter of a closed shape formed by the inflatable connectors 3 is greater than diameter of the central toroidal inflatable chamber 1.

The membrane 6 for accommodating a rescued person is attached to the central toroidal inflatable chamber 1. The bottom toroidal inflatable chamber 5 has the diameter greater than the diameter of the central toroidal inflatable chamber 1 and less than the diameter of a closed shape formed by the inflatable connectors 3. The bottom toroidal inflatable chamber 5 is connected to the central toroidal inflatable chamber 1 by the second inflatable shafts 4.

An air-impermeable fabric 7 is stretched between the first inflatable shafts 2 and the second inflatable shafts 4 for formation of two truncated cones with a common base and where large bases of truncated cones having a different diameter are directed outwards for formation of a conic deceleration shield. The first and the second inflatable shafts 2, 4 are connected with each other by cross flows and connected with an independent gas generator (source).

According to the exemplary embodiment, the top truncated cone is intended for effective aerodynamic braking and stabilization of the device position while in flight. The top truncated cone has the shape of the "inverted truncated cone" formed by the central toroidal inflatable chamber 1 and the first inflatable shafts 2 with the inflatable connectors 3. The top and bottom truncated cones are implemented by the first and the second inflatable shafts 2, 4 which are leak-free and placed along cone generatrix and covered by the air-impermeable covering. Note that in the strict sense, the top truncated cone transforms into a pyramid having in its bases polygons with number of angles equal to number of the first inflatable shafts, (i.e., from 6 to 16, and in the given example equal to 8).

The first and second inflatable shafts 2, 4 of the top and bottom truncated cones and the central toroidal inflatable chamber 1 are interconnected by gas cross-flows and form a uniform, isolated and leak-tight volume. The device is filled with gas under excess pressure and does not change its shape or parameters during the descent. The outer surface of the rescue device can be supplied with the thermal coating providing safety when passing through the sources of an open flame.

The bottom truncated cone is intended for effective aerodynamic deceleration and stabilization of the device position during flight. The bottom truncated cone comprises the second inflatable shafts 4 placed downwards forming a cone and are interconnected by the bottom toroidal inflatable chamber 5. The top truncated cone has the form of the cone, formed by the central toroidal inflatable chamber 1 and the first inflatable shafts 2 with the inflatable connectors 3. The first and the second inflatable shafts 2, 4 have a cylindrical shape.

An air-impermeable fabric (material) covers the bottom and central toroidal inflatable chambers 5, 1 along their bottom edges. Air-impermeable fabric (material) has some calibrated holes for connection of the internal volume of "pneumatic bag" with the atmosphere. The fabric is also attached to the first inflatable shafts 2 of the top cone on the inner side (from the side of symmetry axis of the device).

A pneumatic-frame of the device (i.e., the central and the bottom toroidal inflatable chambers 1 and 5, the first and second inflatable shafts 2 and 4, inflatable connectors 3) is filled with gas to excessive pressure by means of independent filling system. In the process of unfolding of the device from the folded state, atmosphere air penetrates into the damping "pneumatic bag" and the top truncated cone assumes the necessary working shape.

A person is accommodated in the lodgement on the membrane 6. The person is fixed to the lodgement by his back by means of the restraining system. The lodgement is a part of a knapsack in which the device is packed. The lodgement anatomically conforms to the profile of a human back to provide an equable pressure upon the person at the moment of landing. It is strongly attached to the central toroidal inflatable chamber 1.

The amortization system (i.e., a damping system of the rescue device) is intended to decrease the shock load at the moment of landing to a safe level. At the moment when the bottom toroidal inflatable chamber 5 contacts the landing surface (due to elasticity of the second inflatable shafts 4) the bottom toroidal inflatable chamber 5 loses its speed practically to zero with respect to the landing surface. However, the person in the lodgement, the central toroidal inflatable chamber 1 and the top truncated cone due to a larger mass, continue to move towards the landing surface. Due to that the elasticity of the second inflatable shafts 4 to compression is limited "destruction" of the second inflatable shafts 4 (elastic deformation of the second inflatable shafts 4) takes place.

To the moment of the "destruction" of the second inflatable shafts 4 the speed of the person in the lodgement essentially decreases, but movement towards the landing surface continues. Then, in case of considerable movement, the damping "pneumatic bag" is deformed and the inside pressure raises consequently. The higher speed of movement of the person in the lodgement and of the central toroidal inflatable chamber 1 results in the higher excessive pressure in the damping "pneumatic bag."

The excessive pressure in the "pneumatic bag" effects to the central toroidal inflatable chamber 1 with the gas-barrier material attached to it and creates an additional effect, apart from the elasticity of the shafts, which finally eliminates the kinetic energy of a person in the lodgement that leads to the full stop of the lodgement. It should be noted that when the excessive pressure rises in the damping "pneumatic bag" the air from the "pneumatic bag" goes into the atmosphere through the calibrated holes.

The higher excessive pressure in the "pneumatic bag" results in the higher speed of the out-coming air that leads to stabilization or to decreasing of the excessive pressure in the "pneumatic bag". When the quantity, diameters and arrangement of the given holes is correct, it is possible to keep overloads to a person at landing within reasonable safe values. The proposed damping system is universal and helps to guarantee landing of a person of any weight within the prescribed limits of the overload.

According to the exemplary embodiment, the lodgement is designed for placing a person during flight into horizontal position and fixing the person. The person is fixed to the lodgement at their back by means of the restrained system. The lodgement is a part of a knapsack in which the rescue device is packed. The lodgement anatomically conforms to the profile of a human back to provide an equable pressure at the moment of landing. The lodgement is a load-bearing element. It is fastened to the central toroidal inflatable chamber 1 by breaking flanges.

During the flight of the device, effective aerodynamic braking to the speed less than 11 m/s is provided. Landing loads at a touchdown are eliminated by the damping system. Load factor at the moment of landing does not exceed 16 g and time of its effect is less than 0.5 second.

According to the second exemplary embodiment, the central toroidal inflatable chamber 1 is connected on the one side to the first inflatable shafts 2 which are arranged into a cone upon inflation and which are interconnected by inflatable connectors 3 with formation of the top toroidal inflatable chamber 8.

Figure 3:
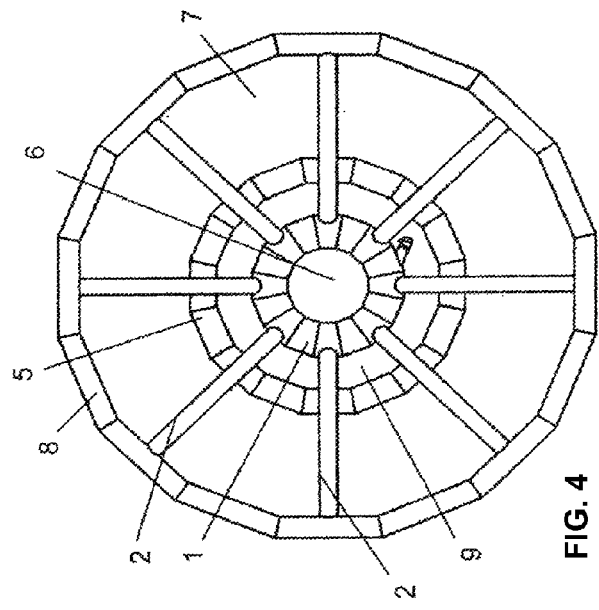
FIG. 3 illustrates a side view of an emergency device for lowering people from high-rise buildings in accordance with a second exemplary embodiment.
Figure 4:
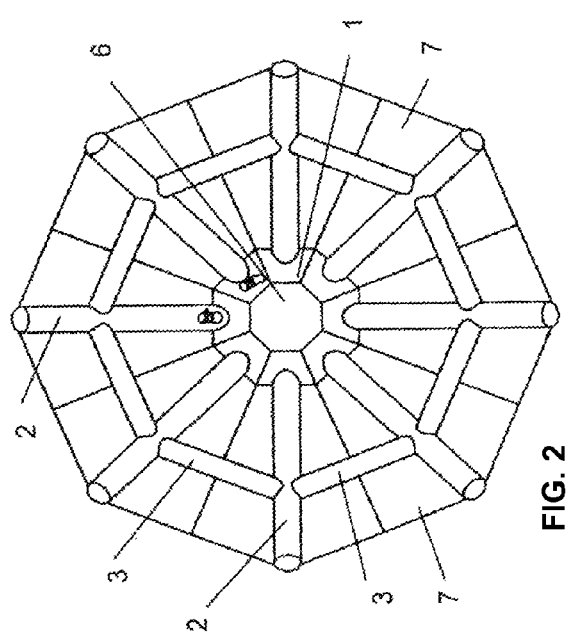
FIG. 4 illustrates a top view of an emergency device for lowering people from high-rise buildings in accordance with a second exemplary embodiment.

The personal emergency device for lowering of people from high-rise buildings according to the second exemplary embodiment (FIGS. 3 and 4) also comprises means for fixing it to the back of a rescued person (i.e., designed in the form of a knapsack, not shown). The personal emergency device includes a central toroidal inflatable chamber 1 inflatable by a gas generator.

The central toroidal inflatable chamber 1 is connected on the one side to the first inflatable shafts 2, which are connected to the top toroidal inflatable chamber 8. The top toroidal inflatable chamber 8 has a diameter greater than the diameter of the central toroidal inflatable chamber 1. The central toroidal inflatable chamber 1 is connected on the other side to an inflatable dumping construction composed of the bottom toroidal inflatable chamber 5 and the second inflatable shafts 4.

The membrane 6 for accommodating a rescued person is attached to the central toroidal inflatable chamber 1 with an independent gas-filling source (not shown). The bottom toroidal inflatable chamber 5 has a diameter greater than the diameter of the central toroidal inflatable chamber 1 and less than the diameter of the top toroidal inflatable chamber 8. The bottom toroidal inflatable chamber 5 is connected to the central toroidal inflatable chamber 1 by the second inflatable shafts 4.

An air-impermeable fabric 7 is stretched between the first inflatable shafts 2 and the second inflatable shafts 4. Alternatively, the first inflatable shafts 2 and the second inflatable shafts 4 are covered by air-impermeable covers. The air-impermeable fabric 7 or air-impermeable covers are perforated.

The membrane 9 is attached to the low end of the bottom toroidal inflatable chamber 5 for formation of two truncated conical pyramids with a common base and with other bases of different diameter directed outwards for formation of a conic deceleration shield. An independent gas-filling source is connected to one of the central toroidal inflatable chamber 1 and the second toroidal inflatable chamber 5 or to one of the first inflatable shafts 2 and the second inflatable shafts 4. The internal areas of all the central and the bottom toroidal inflatable chambers 1, 5 and the first and the second inflatable shafts 2, 4 are connected to one another and form a single closed area.

The construction, according to the second exemplary embodiment, functions similar to the first exemplary embodiment. The proposed system can be manufactured with the use of materials and technologies applied for production of automobile safety systems such as bags inflatable from a gas generator.

Those skilled in the art will appreciate that the proposed system provides for a light weight rescue device that uses less gas for inflation of the device while simplifies the construction. The proposed rescue device provides better safety due to elimination of the device turn-over possibilities at the time of landing.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. An inflatable rescue apparatus comprising:
   a central inflatable toroidal chamber;
   an upper inflatable toroidal chamber;
   a first plurality of inflatable shafts connecting the central inflatable toroidal chamber and the upper inflatable toroidal chamber;
   a lower inflatable toroidal chamber;
   a second plurality of inflatable shafts connecting the central inflatable toroidal chamber and the lower inflatable toroidal chamber;
   a first plurality of pieces of air-impermeable fabric, each of the pieces stretched between inflatable shafts of the first plurality of the inflatable shafts;
   a second plurality of pieces of air-impermeable fabric, each of the pieces stretched between inflatable shafts of the second plurality of the inflatable shafts;
   a first membrane stretched in the central inflatable toroidal chamber when the central inflatable toroidal chamber is inflated;
   a second membrane stretched in the lower inflatable toroidal chamber when the lower toroidal inflatable chamber is inflated;
   a gas source connected to any one of the central toroidal inflatable chamber, the upper toroidal inflatable chamber, the lower toroidal inflatable chamber, the first plurality of inflatable shafts and the second plurality of inflatable shafts,
   such that upon inflation of the any one of the central toroidal inflatable chamber, the upper toroidal inflatable chamber, the lower toroidal inflatable chamber, the first plurality of inflatable shafts and the second plurality of inflatable shafts, all other inflatable elements are also inflated,
   wherein a diameter of the central inflatable toroidal chamber is smaller than a diameter of the lower inflatable toroidal chamber, and wherein the diameter of the lower inflatable toroidal chamber is smaller than a diameter of the upper inflatable toroidal chamber,
   wherein the central inflatable toroidal chamber, the upper inflatable toroidal chamber, the first plurality of inflatable shafts, and the first plurality of pieces of air-impermeable fabric form a first truncated cone when in inflated state,
   wherein the central inflatable toroidal chamber, the lower inflatable toroidal chamber, the second plurality of inflatable shafts, and the second plurality of pieces of air-impermeable fabric form a second truncated cone when in inflated state,
   wherein the second membrane forms a base of the second truncated cone, wherein the first truncated cone is inverted relative to the second truncated cone and shares a common base with the second truncated cone, such that all the inflatable elements, in an inflated state, form a generally hourglass shape.

2. The apparatus of claim 1, wherein the air-impermeable fabric is perforated.

3. The apparatus of claim 1, wherein an outer surface of the apparatus includes a thermal coating.

4. An inflatable rescue apparatus comprising:
a central inflatable toroidal chamber;
a lower inflatable toroidal chamber;
a first plurality of inflatable shafts connecting the central inflatable toroidal chamber and the lower inflatable toroidal chamber;
a first plurality of pieces of air-impermeable fabric, each of the pieces stretched between inflatable shafts of the first plurality of the inflatable shafts;
a second plurality of inflatable shafts connecting the central inflatable toroidal chamber and the upper inflatable toroidal chamber;
a second plurality of pieces of air-impermeable fabric, each of the pieces stretched between inflatable shafts of the second plurality of the inflatable shafts;
a plurality of inflatable connectors connecting adjacent inflatable shafts of the second plurality of inflatable shafts,
wherein the plurality of inflatable connectors are coupled to the corresponding inflatable shafts of the second plurality of inflatable shafts at their mid-portions, such that approximately the inflatable shafts of the second plurality of inflatable shafts extend approximately ⅓ of their length beyond a point where the inflatable connectors are coupled to the corresponding inflatable shafts of the second plurality of inflatable shafts;
a first membrane stretched in the central toroidal inflatable chamber when the central toroidal inflatable chamber is inflated;
a second membrane stretched in the lower inflatable toroidal chamber when the lower toroidal inflatable chamber is inflated;
a gas source connected to any one of the central toroidal inflatable chamber, the plurality of inflatable connectors, the lower toroidal inflatable chamber, the first plurality of inflatable shafts and the second plurality of inflatable shafts,
such that upon inflation of the any one of the central toroidal inflatable chamber, the plurality of inflatable connectors, the lower toroidal inflatable chamber, the first plurality of inflatable shafts and the second plurality of inflatable shafts, all other inflatable elements are also inflated,
wherein a diameter of the central inflatable toroidal chamber is smaller than a diameter of the lower inflatable toroidal chamber, and wherein the diameter of the lower inflatable toroidal chamber is smaller than a diameter of a closed shape formed by the plurality of inflatable connectors,
wherein the central inflatable toroidal chamber, the lower inflatable toroidal chamber, the first plurality of inflatable shafts, and the first plurality of pieces of air-impermeable fabric form a first truncated cone when in inflated state,
wherein the central inflatable toroidal chamber, the plurality of inflatable connectors, the second plurality of inflatable shafts, and the second plurality of pieces of air-impermeable fabric form a second truncated cone when in inflated state,
wherein the second membrane forms a base of the second truncated cone,
wherein the first truncated cone is inverted relative to the second truncated cone and shares a common base with the second truncated cone, such that all the inflatable elements, in an inflated state, form a generally hourglass shape.

5. The apparatus of claim 4, wherein the air-impermeable fabric is perforated.

6. The apparatus of claim 4, wherein an outer surface of the apparatus includes a thermal coating.

* * * * *